United States Patent
Carbonini

(10) Patent No.: US 8,205,647 B2
(45) Date of Patent: Jun. 26, 2012

(54) MACHINE AND DEVICE FOR SUPPLYING BEVERAGES IN CONTAINERS HAVING DIFFERENT SIZES AND METHOD THEREFOR

(75) Inventor: Carlo Carbonini, Villastanza di Parabiago (IT)

(73) Assignee: Rancilio Group SpA, Milan (IT)

( * ) Notice: Subject to any disclaimer, the term of this patent is extended or adjusted under 35 U.S.C. 154(b) by 1212 days.

(21) Appl. No.: 11/988,135

(22) PCT Filed: Jun. 22, 2006

(86) PCT No.: PCT/IB2006/052031
§ 371 (c)(1),
(2), (4) Date: Dec. 31, 2007

(87) PCT Pub. No.: WO2007/004093
PCT Pub. Date: Jan. 11, 2007

(65) Prior Publication Data
US 2009/0126828 A1    May 21, 2009

(30) Foreign Application Priority Data
Jun. 30, 2005 (EP) ..................................... 05425473

(51) Int. Cl.
*A47J 31/00* (2006.01)
(52) U.S. Cl. ........ 141/177; 141/369; 141/378; 141/379; 99/279; 99/323.3; 222/612
(58) Field of Classification Search .................. 141/177, 141/369, 377–379; 222/612; 99/279, 323.3
See application file for complete search history.

(56) References Cited

U.S. PATENT DOCUMENTS

| 4,662,271 | A |   | 5/1987  | Woltermann |
| D309,843  | S | * | 8/1990  | Reichmann ..................... D7/309 |
| 5,353,692 | A | * | 10/1994 | Reese et al. .................. 99/289 T |
| 5,507,329 | A | * | 4/1996  | Shub ............................. 141/351 |

(Continued)

FOREIGN PATENT DOCUMENTS

EP    0645113    3/1995

(Continued)

OTHER PUBLICATIONS

International Search Report for PCT/IB2006/052031; Date of mailing: Nov. 7, 2006; 3 pages.

*Primary Examiner* — Gregory Huson
*Assistant Examiner* — Nicolas A Arnett
(74) *Attorney, Agent, or Firm* — Scott D. Rothenberger; Fulbright & Jaworski

(57) ABSTRACT

The present invention relates to a machine (10) and adaptor device (18) for allowing supply of beverages in containers having different sizes at least in height. The device (18) is fixed to a component (15) of the machine (10) and comprises supporting means (53, 54) arranged to rotate substantially in a plane from a first position, in which the machine (10) is apt to supply the beverages in containers having a first height, to a second position in which the machine (10) is apt to supply the beverages in containers having a second height, lower than the first one. The device thanks to the simple construction can be equipped with a motor in order to rotate the supporting means (53, 54). The device (18) may be adapted also to machines in use.

18 Claims, 3 Drawing Sheets

U.S. PATENT DOCUMENTS

| | | |
|---|---|---|
| 5,782,380 A | 7/1998 | DiSanto |
| 5,860,630 A | 1/1999 | Wildey et al. |
| 6,112,948 A * | 9/2000 | Trigell et al. ................. 222/132 |
| 6,908,012 B1 * | 6/2005 | Pfeifer .......................... 222/108 |
| 7,470,364 B2 * | 12/2008 | Oranski et al. ............. 210/198.1 |
| 2004/0011814 A1 * | 1/2004 | Andrews .................... 222/129.1 |
| 2009/0308493 A1 * | 12/2009 | Buchstab et al. ............. 141/378 |
| 2010/0218848 A1 * | 9/2010 | Dumkow et al. ............. 141/266 |

FOREIGN PATENT DOCUMENTS

JP       09075224       3/1997

* cited by examiner

MACHINE AND DEVICE FOR SUPPLYING BEVERAGES IN CONTAINERS HAVING DIFFERENT SIZES AND METHOD THEREFOR

TECHNICAL FIELD

The present invention relates, in general, to a machine and device for supplying or dispensing beverages. In particular the present invention relates to a machine and a device for supplying beverages in containers having different sizes in height and to a related method of making such machines.

BACKGROUND ART

Machines for supplying beverages, in particular the coffee machines, are known in the art.

Such machines are usually referred to as "traditional", when the constant presence of an operator is required, or as "superautomatic", when the presence of an operator is not required for their operation but a selection made out, for instance, by a user is sufficient for supplying the beverage.

Both such types of machines are generally characterised by the capability of supplying coffee, milk warm water and steam through suitable devices variously formed and controlled that are present on the machine in single or multiple quantity according to the performances required in terms of number of beverages or coffees to be supplied.

As is known, "traditional" or "superautomatic" machines usually comprise a cup-tray (base) for supporting at least one container for the beverage to be supplied, and one or more supplying groups having respective supplying spouts or nozzles placed, in use, at a determined distance or height with respect to the shelf and adapted to supply beverages.

The height of the spouts with respect to the cup-tray is not a univocal value, but it depends, apart from constructive details, on the geographic area or market where the machines are sold.

As a matter of fact, as known, in the Italian market the use of espresso coffee in cup is prevailing, whereby the height of the spouts is, generally, comprised between 80 and 90 mm as the cup is, usually, of a height not higher than 50 mm; in those markets, such as the US market, where the use of great quantities of coffee as well as of milk-based beverages (cappuccino, milk and coffee, hot milk, etc.) served in disposable containers having high capacity, for instance between 350 and 500 g, is prevailing, the containers are of a height higher than 120 mm and therefore incompatible, for instance, with the heights provided in the Italian market.

In order to satisfy the requirements of the markets that, as a rule, use containers having high capacity, manufacturers produce, for such markets, "special" machines wherein the distance of the spouts with respect to the cup-tray is, for instance, comprised between 150 and 160 mm, i.e. sufficient to receive such containers having high capacity. Obviously, a "special" machine so shaped cannot supply espresso coffee in a normal espresso cup placed on the cup-tray of such machines without irreparably damaging the coffee quality, in terms, for instance, of aroma, scent and taste.

Therefore, various solutions have been attempted in order to get around the general problem of supplying espresso coffee in cup by means of "special" machines.

A first type of known solution provides for the use of proper removable supports, separate from the "special" machine, that are placed by the operator on the cup-tray when espresso coffee in cup must be supplied.

Such a solution has the drawback of being cumbersome and, therefore, it is not much appreciated by operators; as a matter of fact, such a solution requires, in an area usually already obstructed by other objects and devices, further space for placing the removable supports when they are not it use.

Moreover, it is to be noted that such removable supports are subject to be hit, to fall to the ground and, in general, to all the typical disadvantages of the objects that are not integral part of a machine.

Finally, such a solution, though simple and immediate, has the drawback of requiring at least the operator's presence and therefore to be applicable solely to the "traditional" type of "special" machines.

A second type of solution is known, for instance, from publication JP_09-075224. Said publication or document provides that the "special" machine for supplying beverages comprises a frontal wall having a plurality of couplers and one or more additional frontal plates to be coupled to the frontal wall and comprising respective mobile elements (shelves and mobile arms) pivotally connected to the frontal plates and adapted, in turn, to support and hold in place the container having limited dimensions in height.

This document also provides that, in case of use of bigger containers, the shelf and the mobile arms are folded upwards against the wall of the frontal plates and coupled to suitable coupling elements provided on the same frontal plates.

A first problem of such a background art is that, in any case, the known mobile elements, being pivotally connected to a flat horizontal surface, when folded upwards, they require coupling elements for preventing the mobile elements from falling and interfering with the supplying of the beverage in bigger container.

Another problem of such a background art is that the shelf and the mobile arms seem particularly complex both to produce (number of parts to be manufactured and assembled) and to use (uncoupling of coupling elements in order to activate the mobile shelf and coupling of such elements to the wall for deactivating the mobile elements).

A further problem consists in that the known solution makes it necessary both to modify the machine and to add a plurality of elements comprising both structural elements (the frontal plates) as well as mobile elements (shelves and arms) that are actually necessary in order to solve the problem of supplying beverages in containers having different heights.

Still another problem consists in that also this second solution requires the operator's presence in order to operate the mobile shelf and arms and fold them and couple them to the frontal plates and therefore also such a solution is applicable solely to the "traditional" type of "special" machines.

The Applicant, in summary, finds that the background art when solving, in general, the problem of supplying espresso coffee in cup by means of "special" machines of the "traditional" type, proposes either solutions not integrated in the machine body and difficult to use or solutions integrated in the machine body but particularly complex as to their production and use.

DISCLOSURE OF THE INVENTION

Object of the present invention is thus to solve the background art problems explained above.

In particular, object of the present invention is a device integrated in the machine body, simple, easy to manufacture, and applicable also to machines already installed and in use.

This object is achieved by means of the machine and device for supplying beverages in containers having different sizes as claimed.

The present invention also relates to a method for supplying beverages in containers having different sizes.

The claims are an integral part of the technical teaching according to the present invention.

According to a preferred embodiment the machine comprises an adaptor device connected to a machine component, for instance a drainage duct of the machine, and comprising support means adapted to rotate around the duct in a horizontal plane in order to support at a suitable height, if required, containers having limited dimensions, as espresso coffee cups.

According to a further feature of the present invention the adaptor device comprises a motor arranged to command the rotation of the support means so that the device is applicable both to "traditional" and "superautomatic" machines.

According to another feature of the present invention the device is applicable to machines already installed that comprise, associated to the supply groups, respective drainage ducts adapted to discharge, if necessary, the water in excess as a result of the coffee supply.

BRIEF DESCRIPTION OF DRAWINGS

These and further features and advantages of the present invention will appear more clearly from the following detailed description of preferred embodiments, provided by way of non limiting examples with reference to the attached figures, wherein components designated by same or similar reference numerals indicate components having same or similar functionality and construction and wherein.

BEST MODE FOR CARRYING OUT THE INVENTION

Figure 1:
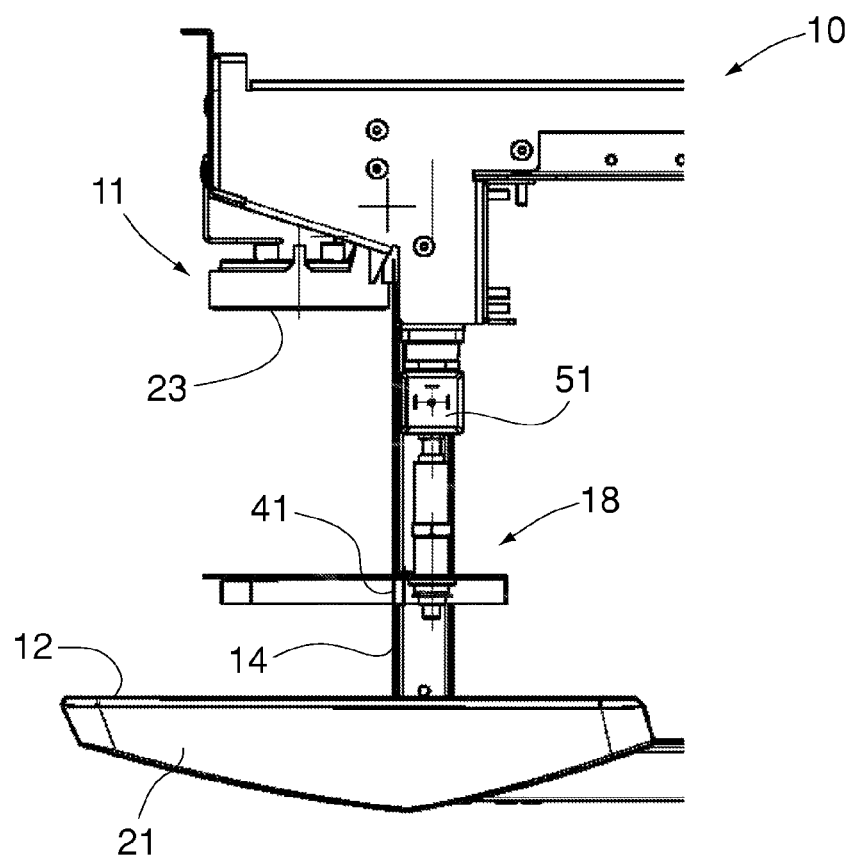
FIG. 1 shows a schematic view of a machine according to the invention.

With reference to FIG. 1, a machine 10 for supplying beverages, for instance a coffee machine of the "traditional" type configured for supplying coffee or coffee-based beverages in containers having different sizes in height comprises, according to a preferred embodiment, a supplying group 11 having, in a frontal area visible by an operator, a nozzle set 23 of known type comprising one or more nozzles.

The machine 10 further comprises a cup-tray (base) 12, known per se, and a frontal wall 14, of known type, comprising one or more frontal elements disposed in substantially vertical position and arranged to separate the frontal area from a non visible rear area.

The supplying group 11 of known type comprises, in the rear area, a drainage device 51, for instance a solenoid valve of known type adapted to discharge in a known way, if necessary, the water in excess as a result of the coffee supply, and having a drainage duct (duct or tang) 15, of known type, for instance of cylindrical cross-section and arranged substantially in vertical position.

Obviously, according to others embodiments, the duct 15 can be substituted with any element or structural member associated to the supplying group and arranged substantially in vertical position.

The base 12 comprises, for instance, a basin 21, known per se, apt to collect the water drained by the drainage device (valve) 51 and is apt to support bigger containers, for instance containers having a height higher than 120 mm.

The frontal wall 14 or at least one of its elements, comprises one or more slits 41 apt to allow, as it will be disclosed later on in detail, the use of shelves for containers having small sizes, such as coffee cups.

According to the preferred embodiment, the machine 10 comprises, associated to the tang 15, an adaptor device (device) 18, shaped so as to allow, for instance, the supply of coffee in cups.

Figure 2:
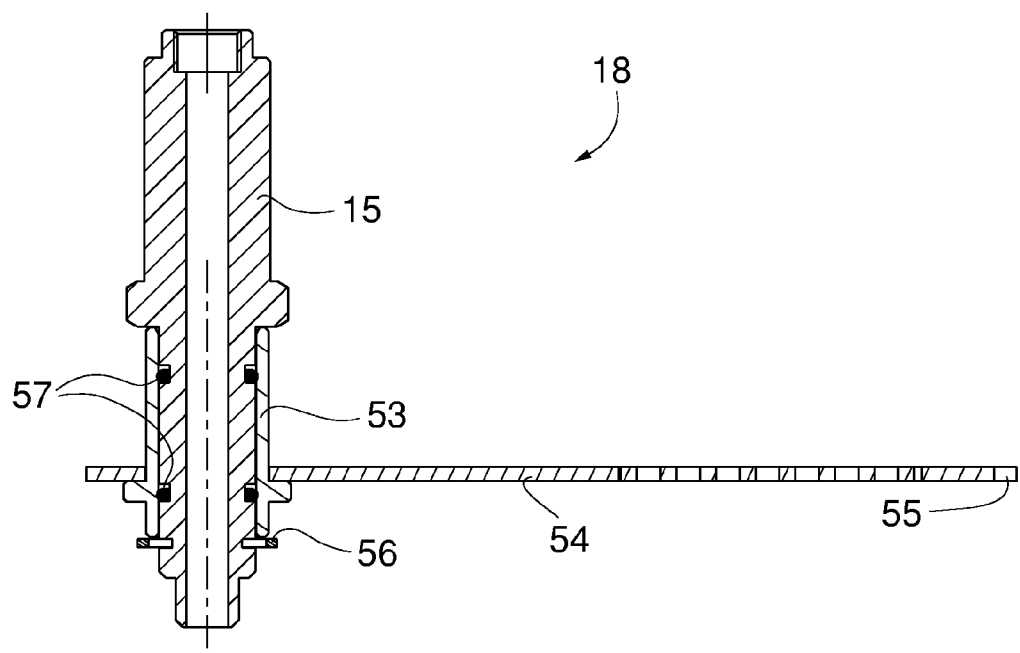
FIG. 2 shows a cross-sectional view of an adaptor device according to the invention in a first embodiment.

The adaptor device comprises a rotating element 53 (FIG. 1, FIG. 2), for instance a bush mounted around the tang 15, and a cup-holding element or tray or shelf 54, secured, for instance, to the rotating element 53.

Both the rotating element (bush) 53 and the shelf 54 are made, preferably, of metallic material, but as easily comprehensible for a technician in the field, said elements can be made of various materials, for instance of plastic materials.

Figure 3A:
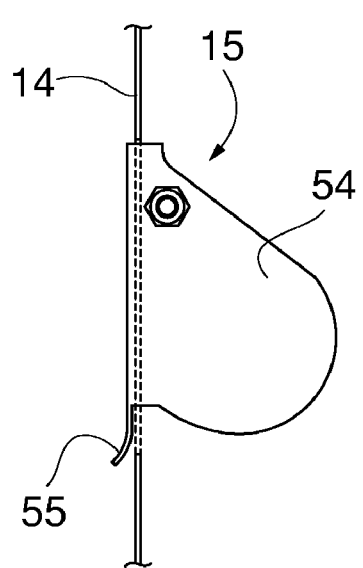
FIGS. 3a and 3b show a first and a second operating position of the device in FIG. 2.
Figure 3B:
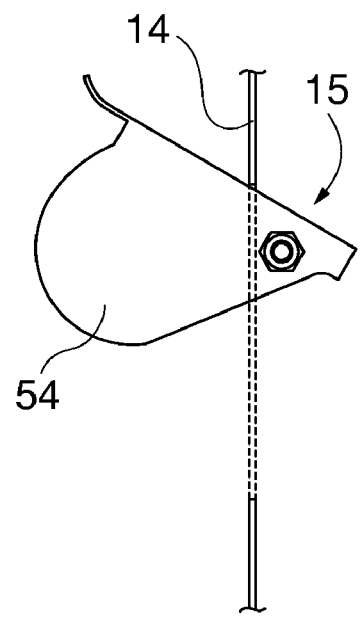

The bush 53 and the shelf 54 are arranged so to rotate, substantially, in a horizontal plane, around the axis of the tang 15 so that the shelf itself 54, as it will be disclosed later on in detail, is apt to assume a first position (FIG. 1, FIG. 3b), corresponding to a position in which the shelf (mobile shelf) 54 projects in the frontal area and is usable as a support, and a second position (FIG. 1, FIG. 3a) in which the mobile shelf 54 is held in the rear area and is not usable as a support and the base 12 is usable instead as a support.

Obviously, when passing from the first position to the second position the shelf passes through the slit 41 in the frontal wall 14 or one of its elements. In others embodiments the slit(s) may also be replaced by a gap between the elements comprised in the frontal wall 14.

The shelf 54, in the preferred embodiment, is placed at a distance of 80, 90 mm from the nozzle set 23.

Preferably, the device 18 comprises, interposed between the bush 53 (FIG. 1, FIG. 2) and the tang, one or more gaskets 57, for instance rubber made annular gaskets, of known type, apt to facilitate the rotation of the bush 53 around the tang 15.

Preferably, the device 18 comprises, associated to the tang 15, a keeper element 56 apt to prevent the bush 53 and the mobile shelf 54 from sliding vertically along the tang 15.

The keeper element 56 can be realised, for instance, as a resilient ring or a similar component inserted in an appropriate cavity of the tang and placed, for instance, at the base of the bush 53; the keeper element is apt to prevent the vertical movement of the bush 53 and the shelf 54 with respect to the tang 15.

Obviously, in other embodiments, the keeper element may be shaped so as to solely prevent the falling movement or allow the positioning of the shelf 54 at different distances from the nozzle set 23.

Figure 4:
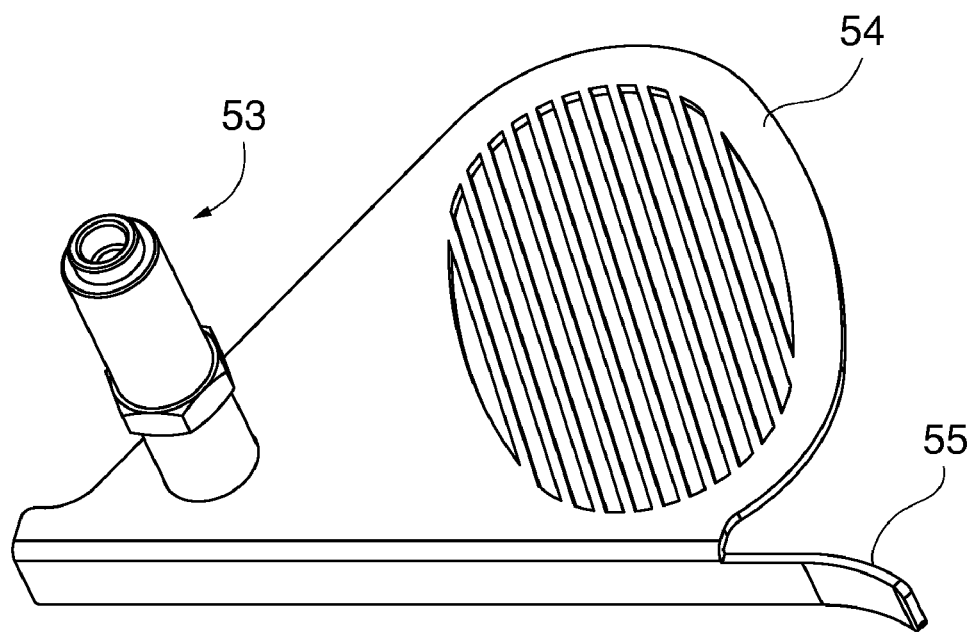
FIG. 4 shows an axonometric view of a component of the device in FIG. 2.

According to a first embodiment, the mobile shelf 54 comprises a holding element 55 (FIG. 4), for instance a metallic tongue having a gasket made of insulating material, shaped so as to be handled by an operator and moved from the first position to the second position.

Figure 5:
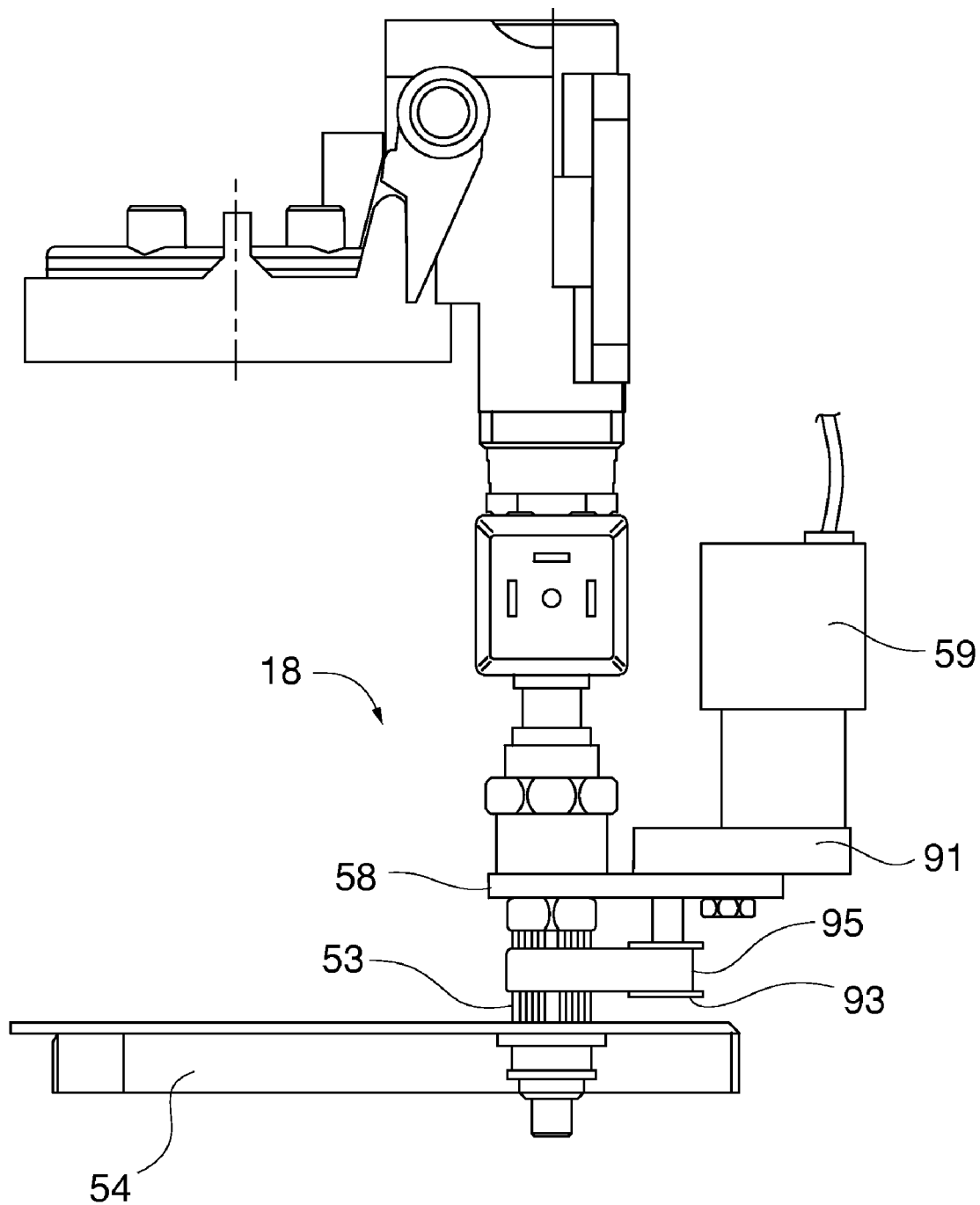
FIG. 5 shows the device according to the invention in a second embodiment.

According to a second embodiment, preferably usable on "superautomatic" machines, but applicable also to "traditional" machines, the device 18 comprises a motor 59 (FIG. 5), for instance an electric motor, apt to activate the rotation of the bush 53 and the shelf 54.

In particular, according to this second embodiment, the motor 59 comprises, for instance, a reduction unit 91, known per se, and a pulley 93, of known type, apt to transfer motion to the bush 53, in a known way, by means of a motion-transmission element 95, for instance a toothed belt.

In this second embodiment the duct 15 comprises an associated a motor-supporting element 58, for instance a plate rigidly associated to the duct and apt to support the motor 59; the bush, in such an embodiment, is shaped so as to cooperate with the motion-transmission element 95, for instance as a gear wheel actuatable by the toothed belt.

The embodiment as disclosed allows the motor 59 to move the bush 53 and the associated shelf 54, for instance, with reciprocating motion equivalent to the one already disclosed in order to move the shelf 54 either to the first position or to the second one.

The shelf 54, in this second embodiment, may not comprise the holding element 55 and, therefore, the movement of the shelf, advantageously, may be in one direction only for obtaining positioning in the first position and in the second one.

As easily comprehensible for a technician in the field, the motor 59 can be operated, for instance, in "traditional" machines, by the operator by means of a suitable push-button, or, for instance in "superautomatic" machines, by the user through beverage selection.

The operation of the device 18 according to the first embodiment is the following.

During the use of the machine 10 with containers to be supported by the base 12, i.e. containers having for instance a height higher than 120 mm, the shelf 54 (FIG. 3a) is placed in the rear area (second position) and the holding element is, for instance, in contact with the frontal wall 14 on a first side of the supplying group 11.

Obviously, as the possible movement of the shelf is of the horizontal type, as easily comprehensible for a technician in the field, the presence of couplers is not required in order to hold the shelf 54.

In case of request for a the supply of a beverage in a container having reduced height, for instance an espresso coffee in cup, the operator grasps the holding element 55 and rotates the shelf 54 until the holding element 55 reaches, for instance, the frontal wall 14 on a second side of the supplying group 11; in such a case the shelf 54 (FIG. 3b) is placed in the frontal area (first position).

At the end of the rotation, the operator can place, for instance, one or two cups, depending on the request, on the shelf 54, under the nozzle set 23, and supply the espresso coffee.

Obviously, at the end of the supply, in case of a request for beverages in bigger containers, the operator will grasp the holding element 55 in order to rotate the shelf 54 in a direction opposite to the one previously used, so as to place the shelf 54 in the starting position.

The operation of the device 18 according to the second embodiment is substantially equivalent to the one disclosed above with the exception that the movement of the shelf 54 is controlled by the motor 59 and that the moving-direction of the rotation can be either of the reciprocating or mono-directional type.

On the basis of the above disclosure it is possible to manufacture, for instance, a "special" machine of the "traditional" or "superautomatic" type, comprising a supply device for supplying espresso coffee in cup highly integrated in the machine structure, simple and having a minimal number of added elements with respect to the structural elements the machine.

The machine 10 and the device 18, as disclosed, take preferably advantage of a structural element or component, for instance the drainage duct 15 which is generally already present in the rear area and is located under the nozzle set 23 and therefore easily usable for supporting the entire device 18.

The device as disclosed, having a movement substantially on the horizontal plane, does not require couplers nor, in the second embodiment, holding elements.

The device as disclosed can be applied also to machines already installed and in use.

As a matter of fact, in order to adapt such machines it is sufficient to replace the tang associated to the valve with a tang having the bush and the shelf and to arrange slits in the frontal wall or in one of its parts or between parts of the frontal wall, said adaptation taking only a few minutes and being possible when the machine is powered on.

Obvious changes and variations are possible to the above disclosure, as regards dimensions, shapes, materials, components, elements and connections, as well as details of the described construction and operation method without departing from the scope of the invention as defined by the claims that follow.

The invention claimed is:

1. A machine for supplying beverages in containers having different sizes at least in height comprising:
   at least one supplying group having at least one nozzle set arranged to supply said beverages and at least one component in substantially vertical position;
   first supporting means having a first distance from said nozzle set and arranged to support at least one first type of containers having a first height;
   at least one adaptor device having second supporting means arranged to be placed at a second distance from said nozzle set lower than said first distance and arranged to support at least one second type of containers having a second height lower than said first height;
   wherein said second supporting means is rotatingly connected to said at least one component and shaped so as to rotate in a substantially horizontal plane; and
   wherein said at least one component is a duct associated to said at least one supplying group.

2. The machine according to claim 1 further comprising at least one wall adapted to separate said machine into
   a first area comprising said nozzle set and defining a supplying area;
   a second area comprising said component and defining a rear area of said wall; and
   wherein said second supporting means is arranged so as to pass through said at least one wall and assume a first position in which said supporting means projects in said supplying area and a second position in which said supporting means projects in said rear area.

3. The machine according to claim 1 wherein said duct is a duct associated to a drainage device of said at least one supplying group.

4. The machine according to claim 1 wherein said second supporting means comprises:
   at least one rotating element mounted around said component; and
   at least one shelf fixed to said at least one rotating element.

5. The machine according to claim 4 wherein said at least one shelf comprises at least one holding element shaped so that said shelf is manually rotated.

6. The machine according to claim 1 wherein
   said adaptor device comprises at least one motor arranged to rotate said second supporting means.

7. An adaptor device for machines having at least one supplying group for supplying beverages in containers having different sizes at least in height and wherein said supplying group comprises at least one component placed in substantially vertical position, comprising:
- supporting means arranged to take
  - a first position in order to allow supplying said beverages in at least one first type of containers having a first height, and
  - a second position in order to support at least one second type of containers having a second height lower than said first height and to allow supplying said beverages in said second type of containers;
- wherein said supporting means is rotatingly connected to said at least one component and is arranged to rotate in a substantially horizontal plane in order to take at least said first position or said second position; and wherein said at least one component is a duct associated to said at least one supplying group.

8. The device according to claim 7 wherein said supporting means comprises:
- at least one rotating element mounted around said component; and
- at least one shelf fixed to said at least one rotating element.

9. The device according to claim 8 further comprising:
gaskets to be interposed between said component and said rotating element.

10. The device according to claim 8 wherein said shelf comprises at least one holding element arranged to be grasped so that said shelf is rotated.

11. The device according to claim 7 further comprising:
at least one motor arranged to rotate said supporting means.

12. The device according to claim 7 further comprising:
a keeper element arranged to maintain said supporting means in a determined vertical position along said component.

13. A method for producing or adapting a machine for supplying beverages in containers having different sizes at least in height in which said machine comprises at least one supplying group having at least one nozzle set, at least one duct in substantially vertical position associated to said supplying group, and first supporting means arranged to support at least one first type of containers having a first height, said method comprising:
- connecting to said at least one duct an adaptor device having second supporting means arranged to
- rotate in a substantially horizontal plane, and
- support a second type of containers having a second height lower than said first height.

14. The method according to claim 13 wherein said step of connecting said adaptor device comprises:
connecting a motor arranged to rotate said second supporting means.

15. A kit for adapting a machine for supplying beverages, said machine comprising
at least one supplying group having at least one nozzle set arranged to supply said beverages in a supplying area and at least one component in substantially vertical position in a rear area, said supplying area being separated from said rear area by at least one wall of said machine, and said component being a duct associated to said supplying group, and
first supporting means having a first distance from said nozzle set and arranged to support at least one first type of containers having a first height,
said kit comprising:
- frontal wall adaptation means arranged to realize at least one slit or gap in said at least one wall;
- at least one replacement component shaped for replacing said at least one component in substantially vertical position associated to said supplying group;
- second supporting means rotatingly connected to said at least one replacement component and shaped so as to rotate in a substantially horizontal plane and pass through said at least on slit or gap in said at least one wall.

16. A machine for supplying beverages in containers having different sizes at least in height comprising:
- at least one supplying group having at least one nozzle set arranged to supply said beverages and at least one component in substantially vertical position;
- first supporting means having a first distance from said nozzle set and arranged to support at least one first type of containers having a first height;
- at least one adaptor device having second supporting means arranged to be placed at a second distance from said nozzle set lower than said first distance and arranged to support at least one second type of containers having a second height lower than said first height;
- at least one wall adapted to separate said machine in
  - a first area comprising said nozzle set and defining a supplying area; and
  - a second area comprising said component and defining a rear area of said wall; wherein
- said second supporting means is rotatingly connected to said at least one component and shaped so as to rotate in a substantially horizontal plane, pass through said at least one wall, and assume a first position in which said supporting means projects in said supplying area and a second position in which said supporting means projects in said rear area.

17. The machine according to claim 16 wherein said component is a duct associated to said supplying group.

18. The machine according to claim 17 wherein said duct is a duct associated to a drainage device of said supplying group.

* * * * *